(12) United States Patent
Borlik

(10) Patent No.: US 10,491,655 B2
(45) Date of Patent: Nov. 26, 2019

(54) SYSTEM, SOFTWARE AND METHODS FOR REMOTE GARDENING

(71) Applicant: Craig Borlik, Provo, UT (US)

(72) Inventor: Craig Borlik, Provo, UT (US)

( * ) Notice: Subject to any disclaimer, the term of this patent is extended or adjusted under 35 U.S.C. 154(b) by 184 days.

(21) Appl. No.: 15/880,195

(22) Filed: Jan. 25, 2018

(65) Prior Publication Data

US 2019/0230148 A1 Jul. 25, 2019

(51) Int. Cl.
| | | |
|---|---|---|
| *H04L 29/08* | (2006.01) | |
| *A01G 25/16* | (2006.01) | |
| *G06Q 50/02* | (2012.01) | |
| *G06Q 20/04* | (2012.01) | |

(52) U.S. Cl.
CPC ............ *H04L 67/025* (2013.01); *A01G 25/16* (2013.01); *G06Q 20/04* (2013.01); *G06Q 50/02* (2013.01)

(58) Field of Classification Search
CPC ...... H04L 67/025; A01G 25/16; G06Q 20/04; G06Q 50/02
See application file for complete search history.

(56) References Cited

U.S. PATENT DOCUMENTS

| | | | | |
|---|---|---|---|---|
| 9,457,473 | B2 * | 10/2016 | Rudakevych | ......... B25J 9/1697 |
| 2002/0049522 | A1 | 4/2002 | Ruffner | |
| 2006/0282274 | A1 * | 12/2006 | Bennett | ................. A01K 29/00 705/7.22 |
| 2010/0268679 | A1 | 10/2010 | Anderson | |
| 2014/0188543 | A1 | 7/2014 | Pearlmutter | |
| 2015/0081058 | A1 | 3/2015 | Oliver et al. | |
| 2016/0033437 | A1 | 2/2016 | Anjum et al. | |
| 2016/0371830 | A1 * | 12/2016 | Barrasso | .............. G06T 7/0004 |
| 2017/0006787 | A1 | 1/2017 | Weiler et al. | |

FOREIGN PATENT DOCUMENTS

| | | |
|---|---|---|
| CN | 105075730 A | 11/2015 |
| CN | 105116858 A | 12/2015 |
| CN | 106295971 A | 1/2017 |
| CN | 106843138 A | 6/2017 |
| KR | 101082836 B1 | 11/2011 |

OTHER PUBLICATIONS

International Search Report from PCT/US19/15026, dated Jun. 20, 2019.

* cited by examiner

*Primary Examiner* — Ziaul Karim

(74) *Attorney, Agent, or Firm* — Durham Jones & Pinegar; Sarah W. Matthews

(57) ABSTRACT

A method of allowing a remote client to control a garden plot is described. The garden plot may be provided with electronically controlled watering devices for remote watering of the garden plot and a 360 degree zoom camera for remote viewing of the gardening plot. The method may include an application server for receiving client instructions, one or more modules for optimizing a planting layout, handling watering instructions, handling camera instructions, handling harvesting instructions, and conducting a virtual and/or local farmer's market to maximize use of the harvest.

18 Claims, 6 Drawing Sheets

SYSTEM, SOFTWARE AND METHODS FOR REMOTE GARDENING

TECHNICAL FIELD

The present invention relates to software, methods and systems for leasing and managing garden plots remotely.

BACKGROUND

Gardening is an enjoyable past time for many, and has several benefits. Gardening may improve health, as the garden yields vegetables and tends to increase consumption of a healthy, varied diet. Gardening is also good for the planet, as it increases activities such as composting, mulching, and consumption of greenhouse gases as the plants grow. Gardening can also be a pastime that save the gardeners money, as vegetables can be expensive to purchase, particularly organic vegetables. Gardening can also increase a person's sense of well-being, as it connects them to a community of other gardeners.

Gardens can also be beneficial not just for the gardener, but also for the community and wildlife. For example, a well-planned garden can benefit wild honey bees, whose population is in decline. Excess vegetables from a garden can be donated to local food banks, which often don't receive fresh, healthy food donations but instead rely heavily on canned foods.

As urban land becomes more and more expensive, gardens can be difficult to plant, as most urban dwellers own little, if any, arable land for gardening land. Additionally, many urban planning boards (such as Homeowner's Associations, etc.) place restrictions on gardening and planting.

Furthermore, some people live in climates which render it difficult to garden many fruits and vegetables. For example, parts of the western United States are very arid and require large amounts of water to grow a garden. In some of these areas water is very expensive and is becoming more so as the population increases.

Thus, there is a need for a system and method that allows persons to garden a plot of land, despite the lack of available/nearby arable land. It may also be desirable for such a system to provide benefits to the community and wildlife, such as providing habitat for wild bees, and/or providing food donations to local food banks, etc.

BRIEF DESCRIPTION OF THE DRAWINGS

The detailed description is described with reference to the accompanying figures. The components in the drawings are not necessarily to scale relative to each other. Like reference numerals designate corresponding parts throughout the several views.

Figure 1:
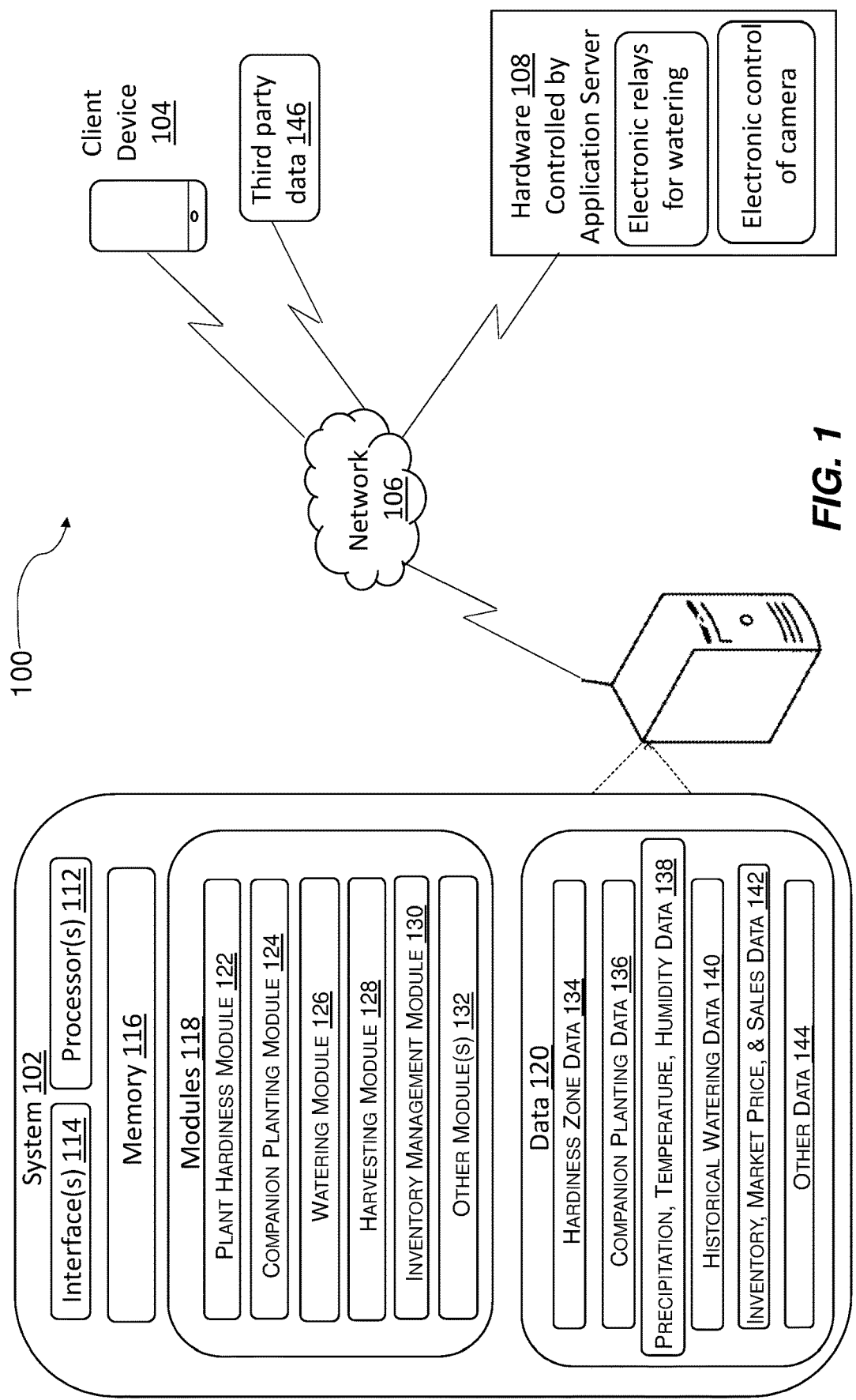
FIG. 1 is an overview block diagram illustrating an exemplary remote gardening system.

It will be appreciated that the drawings are illustrative and not limiting of the scope of the invention which is defined by the appended claims. The various elements of the invention accomplish various aspects and objects of the invention. It is appreciated that not every element of the invention can be clearly displayed in a single drawing, and as such not every drawing shows each element of the invention.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION

The disclosure and accompanying drawings are discussed below, using reference numerals to identify parts and features so as to enable one skilled in the art to practice the present invention. The drawings and descriptions are exemplary of various aspects of the invention and are not intended to limit or narrow the scope of the appended claims.

Furthermore, it will be appreciated that the drawings may show aspects of the invention in isolation and the elements in one figure may be used in conjunction with elements shown in other figures. In light of the present disclosure, the skilled artisan will understand that the methods described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" "one implementation" or "an aspect" means that a particular feature, structure, characteristic or step described in connection with the configuration embodiment or implementation, and may be included in at least one configuration, etc., and not that any particular configuration, etc., is required to have a particular feature, structure or characteristic described herein unless set forth in the claim. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus, it will be appreciated that the claims are not intended to be limited by the representative configurations shown herein. Rather, the various representative configurations are merely representative examples and are provided to help one of ordinary skill in the art to practice the inventive concepts claimed herein.

Furthermore, the described features, structures, steps or characteristics of embodiments, implementations or aspects of the invention may be combined in any suitable manner in one or more embodiments. In the following description, numerous specific details are provided, such as examples of products or manufacturing techniques that may be used, to provide a thorough understanding of embodiments of the invention. One skilled in the relevant art will recognize, however, that embodiments of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect must be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a planting instruction" may include one or more of such planting instructions, and reference to "the garden plot" may include reference to one or more of such garden plots.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Hardware and Software Implementations

FIG. 1 shows illustrates an exemplary implementation 100 of a remote gardening method, implemented in a network, according to an embodiment of the present disclosure. Systems and methods are described herein for providing a method and system for remote gardening, harvesting, and selling vegetables. The methods can be implemented in data collection servers, and communication devices communicating instructions of clients regarding specific gardening actions. The data collection servers and computing systems that can implement the described methods include, but are not limited to, desktop computers, hand-held devices, laptops or other portable computers, tablet computers, mobile phones, PDAs, Smartphones, and the like.

Although the description herein is explained with reference to a client communicating device such as a smart device, the described methods may also be implemented in any other devices, as will be understood by those skilled in the art. For a firmware, and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit. Memory can be implemented within the processing unit or may be external to the processing unit. As used herein the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The manner in which the systems and methods may be implemented is explained in details with respect to the figures. While aspects of described systems and methods can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

The remote gardening control system 102 described herein (FIG. 1), can be implemented in any network environment comprising a variety of network devices, including routers, bridges, servers, computing devices, storage devices, etc. In one implementation the system 102 is connected to one or more client devices 104-1, 104-2, 104-3, etc., individually and commonly referred to as client device(s) 104 hereinafter, through a communication network 106. The client devices 104 may provide the gardening instructions (such as planting instructions, camera instructions, watering instructions, fertilizing instructions and/or harvesting instructions, etc.) associated with the client's remote garden plot to the system 102 through the network 106 for the purpose of remote gardening, harvesting, and/or selling of crops.

The remote gardening system 102 can be implemented as a variety of communication devices. The computing systems that can implement the described method(s) include, but are not limited to, mail server, central directory servers, database server, file server, print server, web server, application server, laptop computer, desktop computer, notebook, workstation, mainframe computer, and the like. The system 102 described herein, can also be implemented in any network environment comprising a variety of network devices, including routers, bridges, servers, computing devices, storage devices, etc. The above-description of the communication network, and the various devices therein, is intended as an overview of the environment in which various embodiments of the remote gardening network 100 implementation, describing a remote gardening system for allowing a client to remotely control actions at a garden plot.

The communication network, and the various devices therein, may contain other devices, systems and/or media not specifically described above. For example, in one implementation it is anticipated that the system 102 may be implemented on an application server or web server. In such a configuration, a client device 104 may communicate instructions to an application or web server 102, and such application or web server may also host software modules. The application or web server may communicate instructions to hardware 108, such as a watering device 110, fertilizer applicator and/or a camera 112, to control such hardware in response to the instructions received at the application or web server from the client device 104 and communicated to the hardware 108 (described in additional detail below with reference to FIG. 3). In another configuration, the system 102 may include not just an application or web server, but the system may also comprise hardware to be controlled by the system, such as one or more of a camera, watering devices, etc. (see block diagram of system 102 in FIG. 2). It will be appreciated that various aspects of the system may be implemented either by including the hardware to be controlled within the system, or by communication of a signal to the hardware to be controlled outside the system by a network 106.

The client devices 104 providing instructions regarding steps to take in the garden plot may be equipment, such as but not limited to, desktop computers, hand-held devices, laptops or other portable computers, tablet computers, mobile phones, PDAs, Smartphones, Smart energy meters, Smart home monitoring systems, smart electric appliances, and the like. Further, the client devices 104 may include devices capable of exchanging data to provide connectivity to different communicating devices and computing systems. Such devices may include, but are not limited to, data cards, mobile adapters, wireless (WiFi™) adapters, routers, a wireless modem, a wireless communication device, a cordless phone, a wireless local loop (WLL) station, and the like. As client devices 104 may be stationary or mobile and may also be understood to be a mobile station, a terminal, an access terminal, a subscriber unit, a station, etc.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as gateways, routers; however, such details have been omitted for ease of understanding.

According to an implementation of the present subject matter, each of the client devices 104 may be connected to one system 102. However, in another implementation, each of the client devices 104 may include an individual system 102 capable of determining an optimal planting layout, receiving watering instructions, etc., prior to providing gardening instructions of the client to a third party farm, or prior to providing instructions to hardware 108.

In one implementation, the system 102 includes processor(s) 112. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), flash memory, and/or non-volatile storage. Other hardware, conventional and/or custom, may also be included.

The system 102 may include interface(s) 114. The interfaces 114 may include a variety of software and hardware interfaces that allow the system 102 to interact with the entities of the network 106, or with each other. The interfaces 114 may facilitate multiple communications within a wide variety of networks and protocol types, including wire networks, for example, LAN, cable, etc., and wireless networks, for example, WLAN, cellular, satellite-based network, etc.

The system 102 may also include a memory 116. The memory 116 may be coupled to the processor 112. The memory 116 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 118 and data 120. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the module(s) 118 includes one or more of a plant hardiness module 122, a companion planting module 124, a watering module 126, a harvesting module 128, an inventory management module 130, and other module(s) 132. The other module(s) 132 may include programs or coded instructions that supplement applications or functions performed by the system 102, e.g, a fertilization module. In said implementation, the data 120 includes data such as USDA hardiness zones data 134; companion planting data 136; weather data 138 such as precipitation data, temperature data, and/or humidity data, etc.; historical watering data 140; inventory, market price, and sales data 142; and other data 144. The other data 144, amongst other things, may serve as a repository for storing data that is processed, received, or generated as a result of the execution of one or more modules in the module(s) 118. Although the data 120 is shown internal to the system 102, it may be understood that the data 120 can reside in an external repository (not shown in the figure), which may be coupled to the system 102. The system 102 may communicate with the external repository through the interface(s) 114 to obtain information from the data 120. It will also be appreciated that the system 102 may obtain third party data 146 over the network and store and update such data 120 on its memory. For example, updated data relating to pricing, demand, and watering may change daily.

Figure 3:
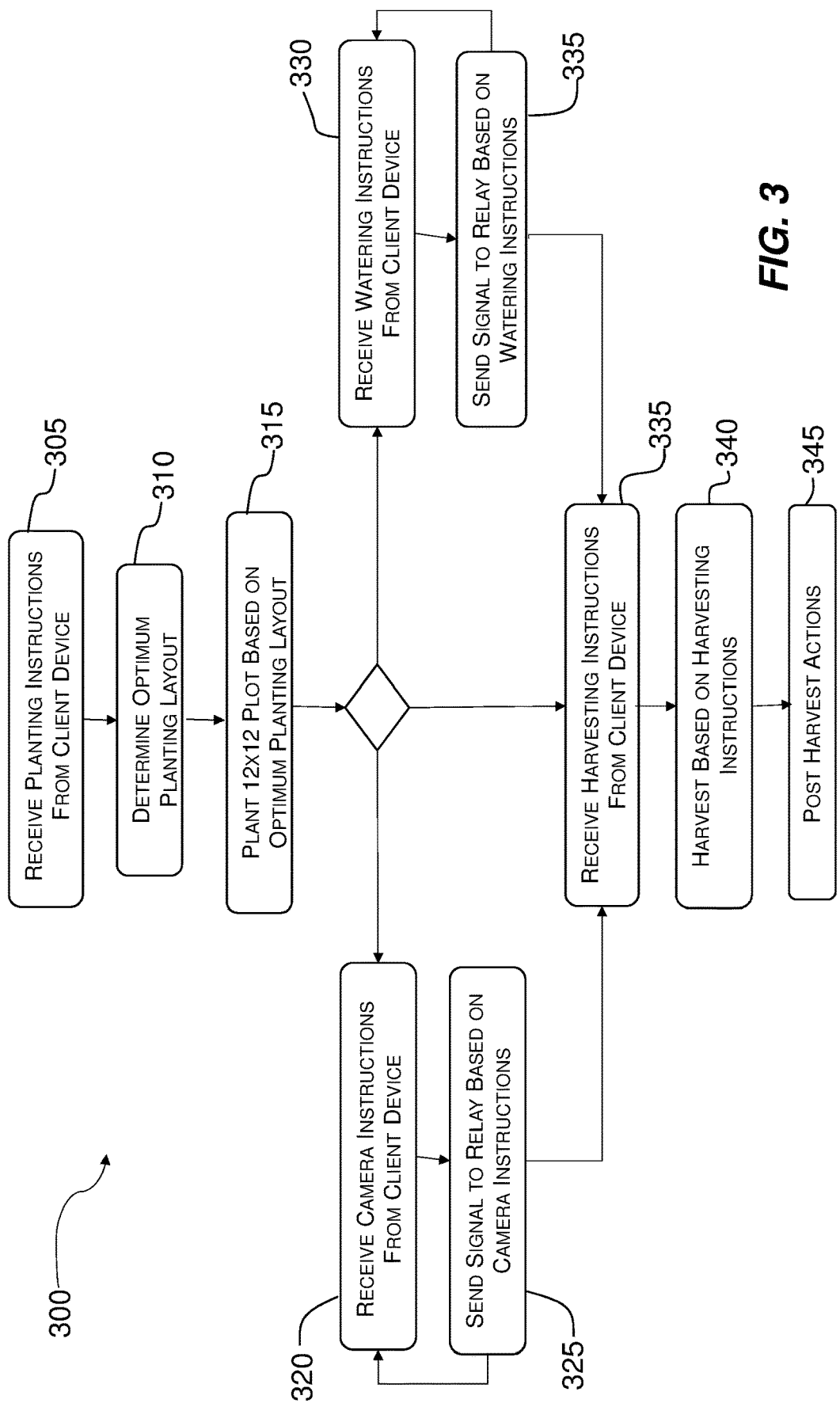
FIG. 3 is a flowchart illustrating an exemplary process, implemented in a network, used by an embodiment of the gardening system.
Figure 4:
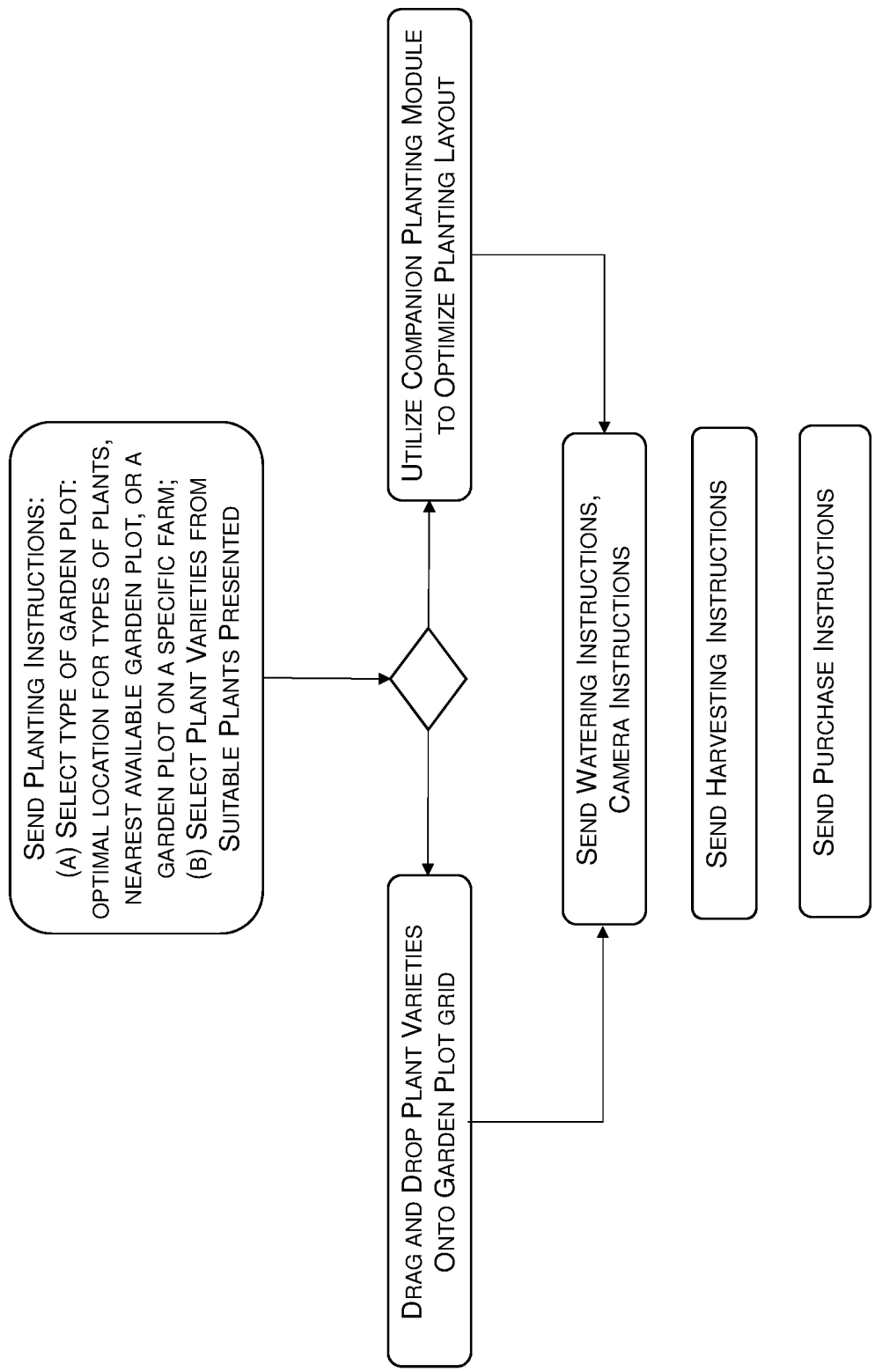
FIG. 4 is a flowchart illustrating a process, implemented in a network, a client may use to utilize according to one embodiment of the gardening system.

As described above, the system is configured or adapted to allow a client to actively garden a remote garden plot, from planting of the plot through post-harvest actions. Turning now to FIG. 3, there is show an exemplary flow chart for a method of remote garden according to one configuration, generally indicated at 300. FIG. 3 describes an exemplary method taken by the system 102, in response to client instructions received from a client device 104. FIG. 4 describes exemplary steps/instructions sent to the system 102 by a client via a client device 104.

The method may include the step of receiving one or more planting instructions from a client device (305 in FIG. 3). The planting instructions may include one or more of a plant variety to plant and/or a particular plot/farm to plant. This step may allow a client to select from a variety of plant options. Exemplary plant varieties are listed in Tables I through V below. The plant varieties may be presented to a client via a user planting interface on a client device 104. In some configurations, a client may first choose a garden plot by selecting to choose varieties of plants that will grow well in their particular zone (and then choose a garden plot near their home or another garden plot in their zone, a similar zone, or a completely different zone), and in other configurations a client may select to choose from all varieties of plants (405 in FIG. 4).

If a client desires to have a garden plot close to their home, they may first enter information about the area they live in, and the nearest available garden plot may be suggested. The user planting interface may then present only varieties of plants that grow well in that particular location, or may present a wider array of plants with an indication of which grow best in that type of location. The user planting interface may be in connection with a plant hardiness module (122 in FIG. 1) that accesses data such as USDA hardiness zone data 134 for varieties of vegetables and the like (plant hardiness module described in more detail below). It will be appreciated that while the data reference is in respect to the planting areas in the United States, in other configurations, planting data relating to any area in the world may be used. Likewise, information about suitable soil types and atmospheric conditions may also be included. Thus, for example, a vegetable which does not grow well in a wet environment may be indicated so that the gardener knows that the plant is unlikely to thrive if his or her garden is in a damp environment.

In other configurations, the client may be presented all plant varieties on the user planting interface, select the varieties of plants they wish to grow, and then a garden plot in the best zone for growing the selected varieties may be suggested by the plant hardiness module 122. The user planting interface may be in connection with a plant hardiness module 122 that has access to one or more databases 120 regarding plant hardiness for a variety of plants, such as USDA planting schedules shown in Tables I through V below. Table I presents USDA planting schedules for USDA Hardiness Zones 1-2. Table II presents USDA planting schedules for USDA Hardiness Zones 3-4. Table III presents USDA planting schedules for USDA Hardiness Zones 5-6. Table IV presents USDA planting schedules for USDA Hardiness Zones 7-8. Table V presents USDA planting schedules for USDA Hardiness Zones 9-10. It will be appreciated that these are exemplary planting schedules, and may be updated from time to time, and also that the schedules may be modified and/or not followed for a particular farm and/or a garden plot, depending on the desired configurations.

In one exemplary configuration wherein the Plant Hardiness Module 122 is deployed, if a client who lives in USDA Hardiness Zone 1 wanted to plant melons and eggplant, the client may choose not to have a garden plot close to their home, because the Plant Hardiness Module 122 may prevent melons and eggplants from being selected to be grown in a garden plot in Zone 1, or may provide warnings that such plants are unlikely to grow well in the given location. Instead, the client may select a garden plot in an optimal location for their desired plants, and choose from all varieties of plants on the user planting interface. After selecting from the varieties presented on the user planting interface, the Plant Hardiness Module 122 may then suggest a garden plot in a suitable location/USDA hardiness zone. This may be accomplished by the plant hardiness module 122 accessing a database with information on the appropriate zones for each variety of plants (such as hardiness zone data 134).

TABLE I

Recommended Planting times for USDA Zones 1 and 2.

| Vegetable | Start plants this long before planting date for zone | Zone 1 | Zone 2 |
| --- | --- | --- | --- |
| Artichokes (globe) | Crown pieces | August-October May-June | August-November April-June |
| Asparagus | 1 year | March-April | February-March |
| Beans (lima) | not suitable | not suitable | May-June |
| Beans (snap) | not suitable | May-June | May-July |
| Beets | not suitable | March-June | March-June |
| Broccoli | 6 weeks | May-June | March-August |
| Brussels sprouts | 6 weeks | May-June | May-July |
| Cabbage | 6 weeks | January-April July-September | April-June |
| Cantaloupes | 4 weeks | not suitable | May |
| Carrots | not suitable | January-June | March-July 15 |
| Cauliflower | 6 weeks | January & June | April-July 15 |
| Celery | 9 weeks | March-June | March-July |
| Chard | not suitable | February-May | April-July |
| Chinese cabbage | 4 weeks | July-August | August |
| Chives | 6 weeks | April-May | March-May |
| Corn (sweet) | not suitable | April-May | April-June |
| Cucumbers (slicing) | 4 weeks | April-June | May-June |
| Cucumbers (pickling) | 4 weeks | May | May-June |
| Dill | not suitable | May | May |
| Eggplants | 9 weeks | not suitable | May |
| Endive | 6 weeks | March-July | April-August 15 |
| Garlic | not suitable | September-October | September-February |
| Kale | not suitable | May-July | May-July |
| Kohlrabi | not suitable | July-August | April-August 15 |
| Leeks | not suitable | February-April | March-May |
| Lettuce (head) | 5 weeks | February-July | April-July |
| Lettuce (leaf) | 5 weeks | February-August | April-August |
| Okra | 8 weeks | not suitable | not suitable |
| Onions | 10 weeks | January-May | March-May |
| Parsley | 10 weeks | December-May | March-June |
| Parsnips | not suitable | May-June | April-May |
| Peas | not suitable | January-August | February-May |
| Peppers | 10 weeks | May | May-June |
| Potatoes (sweet) | 6 weeks | not suitable | not suitable |
| Potatoes (white) | not suitable | February-May | April-June |
| Pumpkins | 4 weeks | May | May |
| Radish | not suitable | All year | March-September |
| Rhubarb | Crown pieces | December-January | March-April |
| Rutabagas | not suitable | June-July | June-July |
| Spinach | not suitable | August-February | April & September |
| Squash (summer) | 4 weeks | May | May-June |
| Squash (winter) | 4 weeks | May | May |
| Tomatoes | 8 weeks | May-June | May |
| Turnips | not suitable | January & August | April-September |
| Watermelons | 4 weeks | not suitable | May |

TABLE II

USDA Planting Schedule for Zones 3-4

| Vegetable | Start seed indoors | Plant seed or plant outdoors |
|---|---|---|
| Asparagus | | April 15-May 1 (crowns) |
| Beans, snap (bush) | | May 15-July 1 |
| Beans, snap(pole) | | May 15-July 1 |
| Beans, dry shell | | May 15 |
| Beans, lima | | May 15-June 10 |
| Beets | | April 15-July 1 |
| Broccoli | March 1-15 | April 15 or June 1 |
| Brussels sprouts | March 1-15 | April 15 or June 1 |
| Cabbage, early | March 1-15 | April 1-May 1 |
| Cabbage, late | April 15-May 1 | June 1 |
| Cabbage, Chinese | | July 1 |
| Carrots | | April 15-June 15 |
| Cauliflower | March 1-15 | April 15 or June 1 |
| Celery | February 15-March 1 | May 15 |
| Chard, Swiss | | May 1 |
| Collards | | April 15 |
| Cucumbers | | May 1-June 15 |
| Eggplant | March 15-April 1 | June 1 |
| Endive | | April 15 |
| Garlic | | October 1-November 1 |
| Horseradish | | April 15-May 1 |
| Kale | | April 15-July 15 |
| Kohlrabi | | April 15-June 1 or August 1-15 |
| Lettuce, leaf | | April 15-June 1 or August 1-15 |
| Lettuce, head | March 1-15 | April 15-May 1 |
| Muskmelon | | May 15-June 1 |
| Okra | March 15-April 1 | June 1 |
| Onion seeds | | April 15 |
| Onion, transplants | February 1-15 | April 15 |
| Onion, sets | | April 15 |
| Parsley | | April 15-May 1 |
| Parsnips | | May 1-15 |
| Peas | | April 10-May 15 |
| Pepper | March 15-April 1 | June 1 |
| Potatoes, Irish | | April 15-June 1 |
| Potatoes, sweet | April 15 (roots) | June 1 |
| Pumpkin | | May 10-June 1 |
| Radish | | April 10-June 1 or August 1-15 |
| Rhubarb | | April 15-May 1 |
| Rutabaga | | May 15-June 15 |
| Spinach | | April 15 or August 1-15 |
| Squash, summer | | May 10-June 1 |
| Squash, winter | | May 10-June 1 |
| Sweet corn | | May 10-July 1 |
| Tomato | April 1-15 | May 15-June 1 |
| Turnip | | April 15 or August 1 |
| Watermelon | | May 15-June 1 |

TABLE III

USDA Planting Schedule for Zones 5-6.

| Crop | Days to Maturity | Spring Planting Dates | Fall Planting Dates |
|---|---|---|---|
| Asparagus | 2$^{nd}$ season | April 5-25 | |
| Bean, bush | 50-60 | April 25-May 30 | July 25-August 5 |
| Bean, pole | 65-75 | May 10-20 | |
| Bean, lima | 65-75 | May 10-25 | |
| Beet | 55-65 | April 1-15 | August 1-September 25 |
| Broccoli | 60-80 | March 25-April 5 | September 25-30 |
| Cabbage | 65-80 | April 1-20 | September 20-30 |
| Cantaloupe | 80-90 | May 10-20 | |
| Carrot | 70-80 | March 25-April 10 | September 20-30 |
| Cauliflower | 55-60 | April 1-20 | September 20-30 |
| Collard | 55-70 | March 20-April 10 | |
| Corn | 80-100 | May 1-July 20 | |
| Cucumber | 60-65 | May 10-30 | |
| Eggplant | 75-90 | May 15-25 | |
| Kale | 50-70 | March 25-April 5 | |
| Kohlrabi | 50-70 | April 1-15 | September 20-25 |
| Lettuce | 60-85 | April 1-May 15 | September 1-15 |
| Mustard | 40-50 | March 25-May 1 | August 1-30 |
| Okra | 55-60 | May 10-25 | |
| Onion (mature) | 100-120 | March 25-April 15 | September 1-December 31 |
| Peas, garden | 60-80 | March 25-April 10 | |
| Peas, southern | 60-70 | May 1-15 | |
| Pepper | 65-80 | May 15-30 | |
| Potato, Irish | 70-90 | April 1-15 | |
| Potato, sweet | 90-150 | May 15-June 5 | |
| Radish | 25-30 | March 25-May 1 | August 1-20 |
| Spinach | 40-45 | April 1-20 | August 10-September 20 |
| Squash, bush | 50-55 | May 15-30 | |
| squash, winter | 85-90 | May 15-30 | |
| Tomato | 70-85 | May 15-30 | |
| Turnip | 45-65 | March 25-May 1 | August 5-September 20 |
| Watermelon | 80-90 | May 10-20 | |

TABLE IV

Planting Schedule for USDA Zone 7-8.

| Crop | Days to Maturity | Spring Planting Dates | Fall Planting Dates |
|---|---|---|---|
| Asparagus | 2$^{nd}$ season | January 15-March 15 | November & December |
| Bean, bush | 50-60 | April 1-May 1 | July 15-August 20 |
| Bean, pole | 65-75 | April 1-May 1 | July 15-August 10 |
| Bean, lima | 65-75 | April 1-June 1 | July 1-August 1 |
| Beet | 55-65 | February 15-April 1 | August 1-September 20 |
| Broccoli | 60-80 | February 15-March 15 | August 1-September 1 |
| Cabbage | 65-80 | January 15-March 15 | August 15-October 1 |
| Cantaloupe | 80-90 | March 25-April 20 | Not recommended |
| Carrot | 70-80 | January 15-March 20 | August 20-September 15 |
| Cauliflower | 55-60 | March 1-April 1 | August 1-September 1 |
| Collard | 55-70 | February 1-March 20 | August 1-October 1 |
| Corn | 80-100 | March 15-June 1 | June 1-July 20 |
| Cucumber | 60-65 | April 1-May 15 | August 20-September 1 |
| Eggplant | 75-90 | April 1-May 15 | July 10-15 |
| Kale | 50-70 | February 1-March 10 | August 10-30 |
| Lettuce | 60-85 | January 15-March 1 | September 1-October 1 |
| Mustard | 40-50 | January 15-April 1 | August 20-October 1 |
| Okra | 55-60 | April 1-June 1 | June 15-July 1 |
| Onion (mature) | 100-120 | January 1-March 15 | September 1-December 31 |
| Peas, garden | 60-80 | January 15-February 15 | Not recommended |
| Peas, southern | 60-70 | April 1-August 1 | |
| Pepper | 65-80 | April 1-June 1 | |
| Potato, Irish | 70-90 | January 15-March 1 | August 1-August 15 |
| Potato, sweet | 90-150 | April 15-June 15 | |
| Radish | 25-30 | January 15-April 1 | September 1-October 15 |
| Spinach | 40-45 | January 15-March 15 | September 1-October 15 |
| Squash, bush | 50-55 | April 1-May 15 | August 1-20 |
| squash, winter | 85-90 | April 1-August 1 | |
| Tomato | 70-85 | March 25-May 1 | June 1-August 10 |
| Turnip | 45-65 | January 15-April 1 | August 10-September 15 |
| Watermelon | 80-90 | March 20-May 1 | Do not plant |

TABLE V

Planting Schedule for USDA Zones 9-10

| Crop | Zone 9 | Zone 10 | Zone 10b |
|---|---|---|---|
| WARM SEASON VEGETABLES | | | |
| Beans, bush | March-April<br>August-September | February-April<br>September | September-April |
| Beans, pole | March-April<br>August-September | February-April<br>August-September | August-April |
| Beans, lima | March-August | February-April<br>September | August-April |
| Cantaloupes | March-April | February-April | August-September<br>February-March |
| Corn, sweet | March-April<br>August | February-March<br>August-September | August-March |
| Cucumbers | February-April<br>August-September | February-March<br>September | September-March |
| Eggplant | February-July | January-March<br>August-September | December-February<br>August-October |
| Okra | March-July | March-August | August-September |
| Peas, southern | March-August | March-September | August-April |
| Peppers | February-April<br>July-August | January-March<br>August-September | August-March |
| Potatoes, sweet | March-June | February-June | February-June |
| Pumpkin | March-April<br>August | February-March<br>August | January-February<br>August-September |
| Squash, Summer | March-April<br>August-September | February-March<br>August-September | January-March<br>September-October |
| Squash, Winter | March<br>August | February-March<br>August | January-February<br>September |
| Tomatoes, Stake | February-April<br>August | January-March<br>September | August-March |
| Tomatoes, Ground | February-April<br>August | January-March<br>September | August-March |
| Tomatoes, Container | February-April<br>August | January-March<br>September | August-March |
| Watermelon, Large | March-April<br>July-August | January-March<br>August | January-March<br>August-September |
| Watermelon, Small | March-April<br>July-August | January-March<br>August | January-March<br>August-September |
| Watermelon, Seedless | March-April<br>July-August | January-March<br>August | January-March<br>August-September |
| COOL SEASON VEGETABLES | | | |
| Beets | September-March | October-March | October-February |
| Broccoli | August-February | August-January | September-January |
| Brussels Sprouts | September-November | October-November | October-December |
| Cabbage | September-February | September-January | September-January |
| Carrots | September-March | October-March | October-February |
| Cauliflower | January-February<br>August-October | October-January | October-January |
| Celery | January-March | August-February | October-January |
| Chinese cabbage | October-February | October-January | November-January |
| Collards | February-April<br>August-November | August-March | August-February |
| Endive/Escarole | February-March<br>September | January-February<br>September | September-January |
| Kale | September-February | September-January | September-January |
| Kohlrabi | September-March | October-March | October-February |
| Leek | September-March | September-February | October-January |
| Lettuce: Crisp, Butter-head, Leaf & Romaine | February-March<br>September-October | September-March | September-January |
| Mustard | September-May | September-March | September-March |
| Onions, Bulbing | September-December | September-December | September-November |
| Onions, Bunching | August-March | August-March | September-March |
| Onions, Multipliers | August-March | August-March | September-March |
| Parsley | September-March | October-February | September-January |
| Peas, English | January-March | September-March | September-February |
| Potatoes | January-March | January-February | September-January |
| Radish | September-March | September-March | October-March |
| Spinach | October-November | October-November | October-January |
| Strawberry | October-November | October-November | October-November |
| Turnips | January-April<br>August-October | January-March<br>September-November | October-February |

Figure 2:
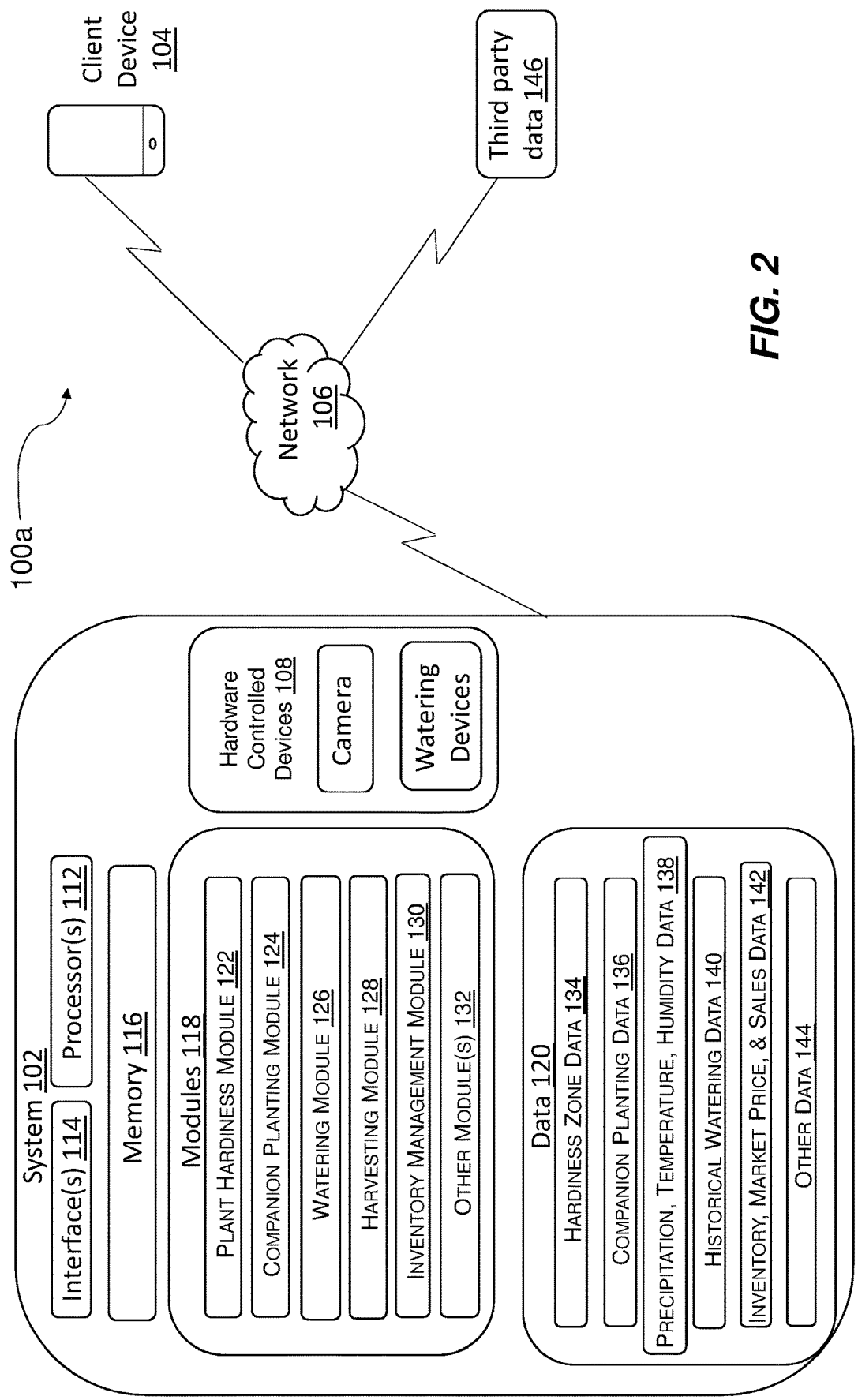
FIG. 2 is a block diagram illustrating another exemplary configuration of a remote gardening system.

The plant hardiness module 122 may also limit the varieties of plants presented on the user planting interface based on a time of the year selected by the user. For example, if the client wants to select plants to plant immediately, and the month is September, the Plant Hardiness Module 122 may limit the varieties of options presented to the client on the user planting interface to varieties that grow well during that season. If the client is located in the Northern hemisphere, this may include plants that over-winter well. Again, such Hardiness Zone Data 134 regarding planting times, peak seasons for plant growth, etc., may be available to the Plant Hardiness Module 122 (FIGS. 1-2). According to some implementations, three growing seasons may be possible, and data relating to planting times for three growing seasons may be stored with the Hardiness Zone Data 134 and may be accessible by the Plant Hardiness Module 122.

According to another configuration, a client may first select the farm on which the client wants their garden plot to be located. This may be desirable if some clients wish to support a particular farm, such as a farm that shares some of the client's values relating to farming and sustainability, or one that is in a particular location. In such a configuration, each particular farm may list the plant varieties that are available for planting at that particular farm. For example, if one farm has had a history of plantings and knows what types of crops do well in their soil and their location, that farm may input such data to the system 102, and that data may be stored in a database accessible to the plant hardiness module.

FIG. 4 illustrates the method according to the steps a client may take (while FIG. 3 illustrates the method according to the steps taken by the system 102). For example, a client may send planting instructions to system 102 by first selecting their type of garden plot (whether they prefer to have their garden plot in a location which is optimized for the particular plants they desire to grown, in the closest available location to the client's home, or at a location at a particular farm, etc). Then, the plant hardiness module 122 may present suitable plants based on the client's selection and the client may select from the suitable plants (step (b) in 405 in FIG. 4). A client may then choose either to configure their own garden plot (410 in FIG. 4) or have the companion planting module optimize the layout of the garden plot (415 in FIG. 4). The farm plants the plot in accordance with the client instructions, and the client may proceed to garden the plot by sending one or more watering instructions, and/or camera instructions (420 in FIG. 4). Planting the plot may be performed by workers at the farm or may be done robotically. At the time of harvest, the client may send one or more harvesting instructions (425) and/or purchase instructions (430), described in additional detail below with respect to the watering, harvesting, and inventory modules.

In addition to presenting plant variety options to a client to plant individual plant varieties based on the location of the garden plot selected by the client, the user planting interface may also have settings to allow a client to plant a grouping of plant varieties. For example, the user planting interface may have an option presented to a client such as a "salsa garden" that automatically includes tomatoes, cilantro, peppers, and onions in the client's garden plot. Similarly, the user planting interface may present a "pizza garden" option that automatically includes tomatoes, peppers, oregano, basil, onions, and garlic. A "tea garden" may include chamomile and mint, etc. Such selections may be programmed to be presented to a client via the user planting interface, and may be customizable.

Figure 5:
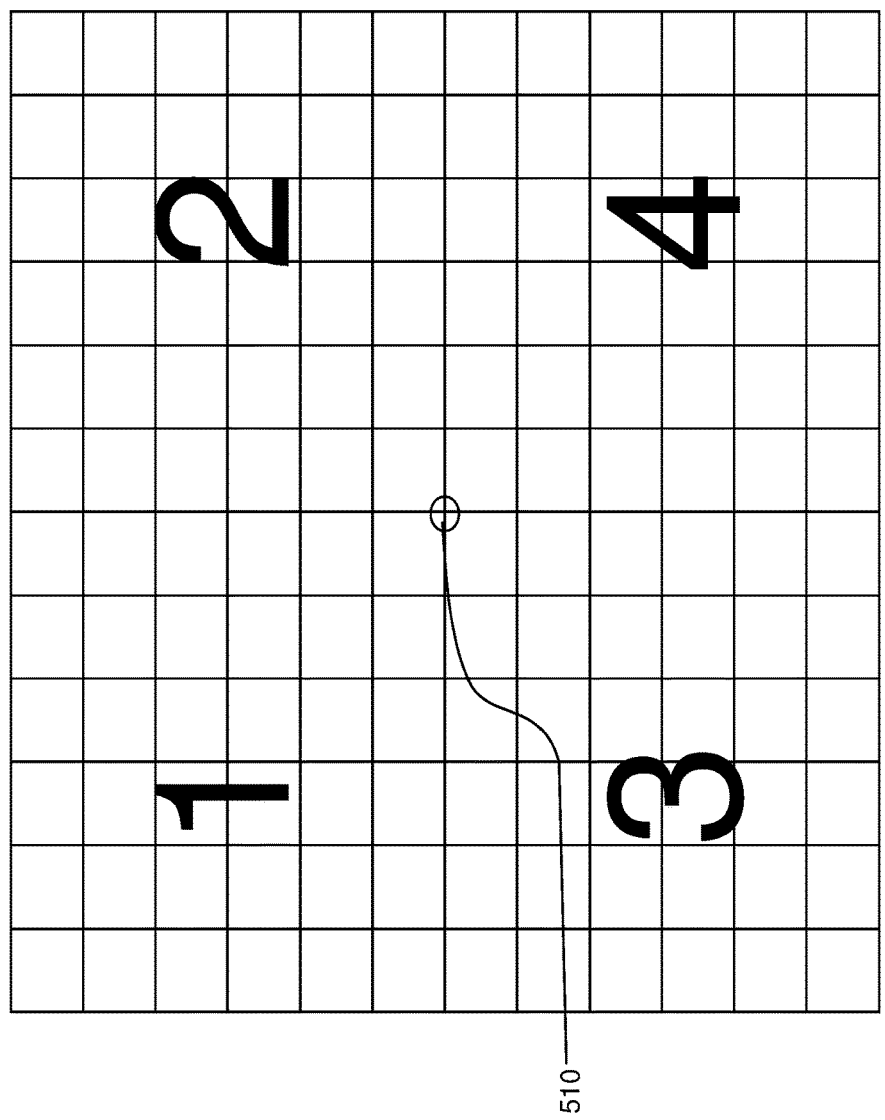
FIG. 5 is a block diagram illustrating an exemplary configuration of a garden plot according to one embodiment of the gardening system.
Figure 5:
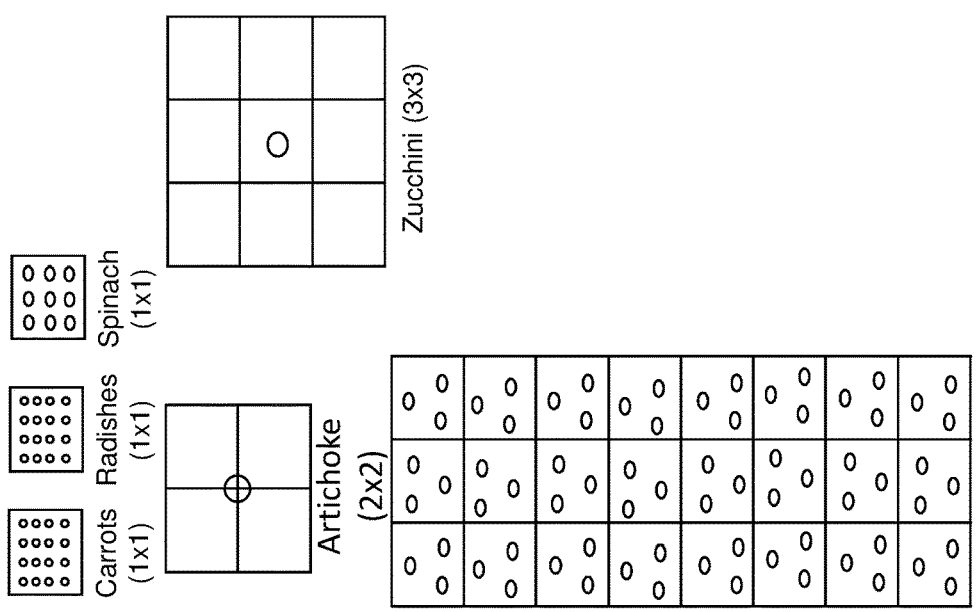

After the farm has received the instructions from a client regarding plantings (305 in FIG. 3), the planting layout may then be determined (310 in FIG. 3). This may be as simple as allowing a client, via the user planting interface, to "drag and drop" plant varieties into a grid that represents the client's garden plot. For example, FIG. 5 shows an exemplary twelve by twelve grid (505), divided into watering zones labeled 1, 2, 3, and 4. A client may "drag and drop" vegetables onto the grid to determine the planting layout. FIG. 5 also shows placement of a camera 510 in the center of the garden plot. It will be appreciated, as noted above, that communications regarding instructions from a client device to the farm may be implemented over one or more networks. According to one configuration, an application or web server may receive the client instructions, and each farm may have a server located thereon to receive one or more instructions over a network. Any suitable server may be used, such as a simple Raspberry Pi server, depending on the size and needs of the farm.

In a presented preferred configuration, instead of, or in addition to, allowing a user to drag and drop their planting configuration, a companion planting module 124 may be used to optimize the planting layout. The companion planting module 124 may be configured to access companion planting data 136 stored on memory regarding various considerations for planting. For example, data such as that shown in Tables VI through VII below, regarding the type of plant, the space needed to grow the plant, and the preferred watering of the plant may be taken into consideration. The companion planting module, for example, may place plants with similar watering requirements together in one location of the garden plot. In one configuration, it is contemplated that the garden plots may be approximately 12 feet by 12 feet, and may be divided into watering zones. Plants with similar watering needs may be placed together in the same zone. It will be appreciated that the data shown in Tables VI through VII need not be followed at every garden plot, and is presented by way of example only. For example, in some configurations, clients may choose to have different plant spacing if desired. In other configurations, plant spacing may be predetermined by a companion planting module 124 and/or by a specific farm depending on the growing conditions at the farm.

According to another aspect, the companion planting module may access data relating to the proximity of the plant to other plants, as well as data relating to cross-pollination[1], insect/pest control[2], sunlight needs, etc. Considerations for companion planting in the literature include trap cropping, symbiotic nitrogen fixation, biochemical pest suppression, physical spatial interactions (such as placing tall, sun-loving plants next to shorter shade-tolerant plants), nurse cropping, beneficial habitats, security through diversity, etc.

[1] Companion planting data is well-known in the art and available in the literature. See, for example, "Companion Planting," by Cornell University Cooperative Extension, Chemung County, 425 Pennsylvania Avenue, Elmira, N.Y. 14904, incorporated herein in its entirety by reference, available at <https://www.slideshare.net/Bakas16w/companion-planting-cornell-university> and <http://www.google.com/url?sa=t&rct=j&q=&esrc=s&source=web&cd=1&ved=0ahUKEwi754rj07fYAhWJqFQKHSeDAPQQFggoMAA&url=http%3A%2F%2Fchemung.cce.cornell.edu%2Fresources%2Fcompanion-planting&usg=AOvVaw1g_mumYBC7ElmbM379nwpu>. See also, "Companion Planting: Basic Concepts & Resources," by George Kuepper and Mardi Dodson, incorporated herein in its entirety by reference, available at <https://www.asu.edu/fm/documents/arboretum/CommunityGardenATTRA-CompanionPlanting.pdf>

[2] Companion planting for insect pest control is known in the art, see, for example, "Companion Planting and Insect Pest Control," Chapter 1 and references therein, by Joyce E. Parker, William E. Snyder, George C. Hamilton and Cesar Rodriguez-Saona, which is incorporated herein in its entirety by reference.

For example, it is known in the art that beets add mineral to the soil, and this may help plants such as brassicas, lettuces, and cucumbers. However, it is also known that beets stunt the growth of pole beans. If the client has selected to plant beets, pole beans, and lettuces for their garden plot, the companion planting module may be programmed to optimize the farthest distance between the beets and the pole beans, and minimize the distance between the beets and the lettuces (while also considering, for example, watering needs as described above, sunlight/shade needs, cross-pollination, etc.). The companion planting module may be programmed with software that executes code to optimize the location of the plants in the garden plot. For example, CAD software may be used to optimize the layout of the plants in the garden plot.

According to another configuration, the client may be able, via the user planting interface, to select where they would like to place each chosen variety of plant on their garden plot, such as via a "drag and drop" option displayed on the user planting interface as described above. The companion planting module may either let the client take complete control, and/or the companion planting module may display a warning when plant varieties which do not do well growing next to each other are placed next to each other by the client.

Similarly, the companion planting module may be programmed to make companion planting suggestions to a client. The companion planting module may make suggestions when the client has selected one variety of plant, such as another variety that may have a beneficial effect to that plant (such as deterring a pest and/or a beneficial physical spatial relationship). For the beets example above, a client may "drag and drop" beets onto the grid representing their garden plot, and then the companion planting module may suggest that the client plant lettuces next to the beets. Or, if the client selected lettuces, the companion planting module may suggest a plant such as beets to add minerals to the soil for the lettuce. It will be appreciated that the companion planting module may be programmed to take an active or a passive role in the planting layout, depending on the desired results and experience for the client.

TABLE VI

Exemplary Plant Varieties and Suggested Space Requirements

| Plant Variety | Space Requirement (Min. No. of Square Feet) | Plants per square foot |
|---|---|---|
| Artichoke | 2 × 2 | 1 |
| Asparagus | 2 × 2 | 8 (9 inches apart each) |
| Beans (bush) | 1 × 1 | 9 (3 × 3 rows) |
| Beans (pole: green, purple, yellow) | 1 × 1 | 8 (2 staggered rows of 4) |
| Beets | 1 × 1 | 9 (3 × 3 rows) |
| Bell Peppers (green, yellow, orange, purple) | 1 × 1 | 1 |
| Broccoli | 1 × 1 | 1 |
| Broccoli Rabe | 1 × 1 | 1 |
| Brocollini | 1 × 1 | 1 |
| Brussel Sprouts | 3 × 3 | 4 per 9 square feet (2 × 2 rows 18 inches apart) |
| Carrots (orange, purple, rainbow) | 1 × 1 | 16 (4 × 4 rows) |
| Cabbage (Napa, bok choy) | 1 × 1 | 1 |
| Cauliflower | 3 × 3 | 4 per 9 square feet (2 × 2 rows 18 inches apart) |
| Chard (green, rainbow) | 1 × 1 | 4 (2 × 2 rows) |
| Corn | 3 × 3 | 27 per 9 square feet (8 inch seed spacing, 3 per 1 square foot) |
| Cucumbers (lemon, English, standard) | 1 × 1 | 2 |
| Eggplant (purple, Chinese) | 1 × 1 | 1 |
| Garlic | 1 × 1 | 16 (4 × 4 rows) |
| Grapes (eating grapes, wine grapes, juice grapes, etc.) | 6 × 6 12 × 12 | 1 vine in 6 × 6 9 vines in 12 × 12 |
| Greens (Swiss Chard, Kale, Collard, Mustard) | 1 × 1 | 4 (2 × 2 rows) |
| Herbs (Basil, Chives, Cilantro, Dill, Oregano) | 1 × 1 | 4 (2 × 2 rows) |
| Decorative Gourds | 2 × 2 | 1 |
| Lettuces (Endive, Raddicio/Chicory, Butter, Green Leaf, Red Leaf, Romaine) | 1 × 1 | 4 (2 × 2 rows) |
| Okra | 1 × 1 | 1 |
| Onion | 1 × 1 | 16 (4 × 4 rows) |
| Parsnips | 1 × 1 | 16 (4 × 4 rows) |
| Peas (Sugar, Snow, Snap) | 1 × 1 | 8 (2 staggered rows of 4) |
| Hot Peppers (Scorpion, Trinidad, Ghost, Habanero, etc.) | 1 | 1 |
| Pumpkins | 1 × 2 or 2 × 2 | 1 |
| Radishes | 1 × 1 | 16 (4 × 4 rows) |
| Rhubarb | 3 × 3 | 1 |
| Spinach | 1 × 1 | 9 (3 × 3 rows) |
| Summer Squash (Patty Pan, yellow) | 3 × 3 | 1 |
| Tomatillos | 1 × 1 | 1 |
| Tomatoes | 2 × 2 | 1 |
| Turnips | 1 × 1 | 9 (3 × 3 rows) |
| Zucchini | 3 × 3 | 1 |

TABLE VII

Companion Planting Chart

| Plant Variety | Watering Requirements | Other Considerations* | Good Companion Plants | Poor Companion Plants |
|---|---|---|---|---|
| Artichoke | | | | |
| Asparagus | Moderate to high (i.e., not draught-resistant) | | Basil, Tomato, *Nasturtium*, Parsley | Onion, Garlic, Potato |
| Beans (bush) | Low to moderate | | Cucumbers, strawberry, celery | Fennel, onion |

TABLE VII-continued

Companion Planting Chart

| Plant Variety | Watering Requirements | Other Considerations* | Good Companion Plants | Poor Companion Plants |
|---|---|---|---|---|
| Beans (pole: green, purple, yellow) | Low to moderate | Grow tall, may be best planted on north side | Radishes | Beets, *brassicas*, onion |
| Beets | | | *Brassicas*, Lettuce, Onion, Sage, bush beans, cabbage | Bean (pole) |
| Bell Peppers (Green, Yellow, Orange, Purple) | | | | |
| *Brassicas*: Broccoli, Broccoli Rabe, Brocollini | Moderate to high (i.e., not draught-resistant) | | Beets, Spinach, Chard, Peas, Celery, Chamomile, Dill, Rosemary | Oregano, Strawberry, Pole Beans |
| Brussel Sprouts | Moderate to high (i.e., not draught-resistant) | | Potato, Thyme | Strawberry |
| Carrots (orange, purple, rainbow) | | | Bush Beans, Pole Beans, Lettuce, Onion, Pea, Radish, Tomato | Chives, Dill, Parsnip |
| Cabbage (Napa, bok choy, etc.) | Moderate to high (i.e., not draught-resistant) | | Beans, Beet, Potato, Oregano, Sage, Celery | Strawberry, Tomato |
| Cauliflower | Moderate to high (i.e., not draught-resistant) | | Beans, Spinach, Celery, Oregano | *Nasturtium*, Potato, Strawberry, Tomato |
| Chard (green, rainbow) | Moderate to high (i.e., not draught-resistant) | | *Brassicas* | |
| Corn | For sweet corn, moderate to high (i.e., not draught-resistant) | | Beans, Cucumber, Melon, Pea, Pumpkin, Potato, Radish | Tomato, celery |
| Cucumbers (lemon, English, standard) | | | Beans, Celery, Lettuce, Pea, Radish, Beets | Cauliflower, Potato, Basil |
| Eggplant (purple, Chinese) | | | Beans, Potato, Spinach, Peppers | |
| Garlic | | | Broccoli, Eggplant, Lettuce | Asparagus |
| Decorative Gourds | | | | |
| Greens (Swiss Chard, Kale, Collard, Mustard) | Moderate to high (i.e., not draught-resistant) | | | |
| Herbs (Basil, Chives, Cilantro, Dill, Oregano) | | | | |
| Lettuce | Moderate to high (i.e., not draught-resistant) | | Beets, Beans, onion, Broccoli, Carrots | Celery, Cabbage, Parsley |
| Okra | | | Tomatoes, Peppers, Beans, Lettuce | |

TABLE VII-continued

Companion Planting Chart

| Plant Variety | Watering Requirements | Other Considerations* | Good Companion Plants | Poor Companion Plants |
|---|---|---|---|---|
| Onion | | | Bean Sprout, Broccoli, Cabbage, Lettuce, Strawberry, Tomato | Bean, Pea |
| Parsnips | | | | |
| Peas (Sugar, Snap, Snow) | | | Beans, Broccoli, Carrot, Corn, Cucumber, Radish | Onion family |
| Hot Peppers (Scorpion, Trinidad, Ghost, Habanero, etc.) | | Humidity (may be provided by other pepper plants and/or tomatoes) | Okra, Beans, Tomatoes, onions, basil | |
| Pumpkins | | | | |
| Radishes | | | Corn, Marigold English Pea, *Nasturtium,* Lettuce, Cucumber | Irish Potato Hyssop |
| Rhubarb | | | | |
| Spinach | | Likes shade | *Brassicas,* Celery, Cauliflower, Eggplant, Strawberries | |
| Summer Squash (Patty Pan, yellow) | | | *Nasturtium,* Corn, Marigold | Irish Potato |
| Tomato | Low to moderate | | Asparagus, *Brassicas,* Cabbage, Celery, Carrot, Peppers, Marigold | Corn, Fennel, Potato, Chili Peppers, cabbage |
| Turnips | Moderate to high (i.e., not draught-resistant) | | | |
| Zucchini | Low to moderate | | *Nasturtium* | |

After the planting layout is finalized (either by the companion planting module and/or by the client), the planting layout instructions are sent to the particular farm which the client's plot is located (for example, a particular farm chosen by the client, a farm suggested by the plant hardiness module, and/or a farm closest to the client). The selected farm then plants the client's plot as instructed by the planting layout (315 in FIG. 3). In some configurations, the client may choose to start the plants by seed and/or to plant seedlings (where available).

According to another implementation, if a user has selected the option to control a garden plot, and payment instructions have been received but no planting instructions have been received, a method may be provided to plant the garden plot. For example, if spring planting for the garden plot should commence in April and no planting instructions are received by April 1, one or more of the plant hardiness module 122, companion planting module 124, and/or inventory management module 130 may be used to provide instructions on an optimal planting. For example, data relating to demands and prices of crops 142 and other data 144 may be used to determine the optimal planting. In another configuration, a client may choose to have the planting automatically selected by the system.

After the garden plot is planted according to the planting layout, the farmer may then take care of the garden plots and plants until harvest time. According to one presently preferred configuration, the client may continue to interact with the garden as the plants grow. For example, the client may be in control of watering the garden plot, and/or in control of a camera to view the garden plot. In FIG. 3, the client is in control of both, and the farm server may receive instructions from a client device (via another server or directly) regarding both watering and camera control. The farm server may be in communication with one or more controllers for watering and/or camera control. Any suitable processor/controllers may be used, and in one configuration each of the camera and the watering system are provided with their own microcontrollers in communication with the farm server.

For example, a client may provide camera instructions (320 in FIG. 3) to move a camera located on or near their garden plot. A client may wish to check the growth and health of the plants via the camera. The camera options may be displayed to the client on the user planting interface, and may allow the client to select from several camera instruction options. For example, the camera may be a 360° zoom camera, and the client instructions may be to rotate the camera, and/or zoom in with the camera lens (such cameras are commonly available, such as a 1080p full HD, 360° zoom IP camera which may allow for full high definition viewing to determine the needs of the plants). The camera could also be mounted on a movable arm so that the user can move the camera within his or her plot to view plans from different angles. As the farm server receives the camera instructions from the client device (320), the farm server may then send a signal to an electronic relay to execute such instructions and move and/or rotate the camera and/or adjust the zoom of the camera lens (325).

The camera may be equipped with a controller and communications hardware to provide remote viewing by the client, such as remote viewing via the internet. In some configurations, a client may have a particular password to access feed to their camera, and in other configurations, a client may choose to have the camera feed publicly available. Clients may desire, for example, to share their camera feed with others, such as via social media and other internet websites.

According to another configuration, a client may also interact with their garden plot by providing one or more watering instructions. Such watering options may be displayed to the client on the user planting interface, and may allow the client to select from watering options. For example, a client's garden plot may be divided into watering zones, such as four watering zones for a twelve foot by twelve foot plot. FIG. 5 shows an example of a twelve foot by twelve foot gardening plot, with four equal-sized watering zones, 1-4. It will be appreciated that watering zones can be varying shapes and sizes depending on the needs of the client and/or the plant varieties chosen. In one configuration, the client may build the watering zones themselves by selecting the size and shape desired for each zone. In other configurations, a watering module 126 may be provided to automatically provide the shape and size of each watering zone based on information received regarding watering needs from the companion planting module 124. Such a watering module 126 may have access to data relating to the watering needs of different varieties of plants.

Several possible configurations for watering of a remote garden plot are possible in accordance with the principles described herein. According to one exemplary configuration, as shown in the method in FIG. 3, a client may provide watering instructions (such as via an interface on a client device 104), such instructions may be sent to an application or web server, and then communicated to a farm server over a network 106. The farm server may receive the watering instructions from the client device (330 in FIG. 3) (it will be appreciated that the farm server may receive the directions directly from the client device over a network, and/or through a series networks and/or servers). In response, the system may send a signal(s) to an electronic relay based on such watering instructions (335 in FIG. 3).

Watering instructions from the client device may be selected in a variety of ways. For example, a watering module 126 may be provided. A client may program watering instructions to be sent daily automatically, and such instructions may be stored either on the client device or on the watering module 126. A client may also select to water based on precipitation received at or near their garden plot (or projected precipitation). For example, the watering module 126 may access data, such as data 138 relating to the precipitation received, and automatically select the appropriate watering required. If it has recently rained (or there is a high likelihood of rain) at the farm where the client's garden plot is located, the watering module 126 may skip that day's watering to conserve water and prevent over-watering plants.

According to another implementation, a client may be forced to manually select the watering options daily (i.e., no automatic watering). This may be preferable in configurations where it is desirable to have the client interacting with the garden daily, such as checking the garden via the camera (loop 320-325 in FIG. 3), and/or watering the garden daily (loop 330-335 in FIG. 3).

According to another implementation, when a client is unable to water the garden, as may happen, for example, due to vacation, etc., a client may select "vacation mode." The watering module 126 may be able to provide various watering configurations on "vacation mode." For example, the watering module 126 may access historical watering data 140 relating to the historical watering of the zones of the client's garden plot, and may then continue to water the garden plot each day based on this historical watering data 140. For example, when a client provides a watering instruction, such watering instruction may be implemented by the watering module 126, and the data relating to the watering may be stored as historical watering data 140. Then, on "vacation mode," the watering module 126 may access such historical watering data 140 and continue watering in a like manner.

The watering module 126 as set to "vacation mode" could also be supplemented and adapted based on additional data, such as: increasing the water gradually over time as the plants increase in size and have greater water demands; decreasing/increasing the watering based on the crop cycle; increasing/decreasing the water based on local weather data such as temperature, precipitation, and/or humidity, etc. An algorithm that takes all such supplementary data into consideration may be provided as part of the watering module 126.

As the client continues to interact with the garden plot after planting (such as via interface(s) that allows the client to control the camera and/or water the garden plot), the garden plot will eventually be ready for harvest. In temperate USDA zones, 3 crop cycles per year are often possible. For example, after approximately 2-4 months, many of the plants may be ready for harvesting (some may be ready even sooner). A client may send harvesting instructions to the farm where their garden plot is located. For example, a client may send harvesting instructions on a particular day each week. This may simplify the harvesting process on the farm, and may also coincide with a day of a local farmer's market. As seen in FIG. 3, the farm and/or application server may receive harvesting instructions from a client device (335), harvest based on such harvesting instructions (340), and then take post-harvest actions (345). These steps are explained in more detail below.

According to one implementation, the farm may view the garden plots on a particular day of the week (such as Friday), and input to a harvesting module 126 what crops are ready for harvest that week. The farm may manually inspect the client's plot each week to determine what is ready for harvesting. This may ensure that the client is aware of all vegetables which are ready for harvest, as vegetation may obstruct some crops which may be ready for harvest. A user interface may automatically present to a client on a particular day each week an inquiry to seek instructions regarding the plants which have been indicated as ready for harvest.

As the farm determines each type of vegetable and how many are ready for harvest that particular week, the farm may use a harvesting module 126 to automatically generate a "ticket" for each vegetable that is ready for harvest. For example, every Friday during a harvest period, a client may receive an inquiry from the user interface and/or an email requesting the client to select options such as "Harvest—Ship," "Harvest—Sell," "Harvest—Donate," "Do Not Harvest," etc., for each crop which has been indicated as ready for harvesting (it will be appreciated that readiness for harvest may be determined either by a user via a camera, or by the farm). The client may then provide post-harvest instructions for each ticket (such as "ship" to ship the vegetable to the client for their personal use, "sell" to add the vegetable for sale in a farmer's market, and/or "donate" to donate the vegetable to a local charity, etc.).

A client may send harvesting instructions, and such instructions may include whether or not to harvest a particular plant, and/or post-harvest instructions. In one configuration, a client may choose whether to ship the harvest (such as shipping overnight to themselves, shipping to a friend, etc.), whether to allow the harvest to be sold at a farmer's market, and/or whether to donate the harvest to a charity such as a food bank. The farm may receive such instructions, including whether to harvest (335 in FIG. 3), then the farm may harvest according to such instructions (340 in FIG. 3). The farm may then take post-harvest actions (345 in FIG. 3), such as send the harvest to a farmer's market or other local market, ship the harvest, donate the harvest, etc.

Figure 6:
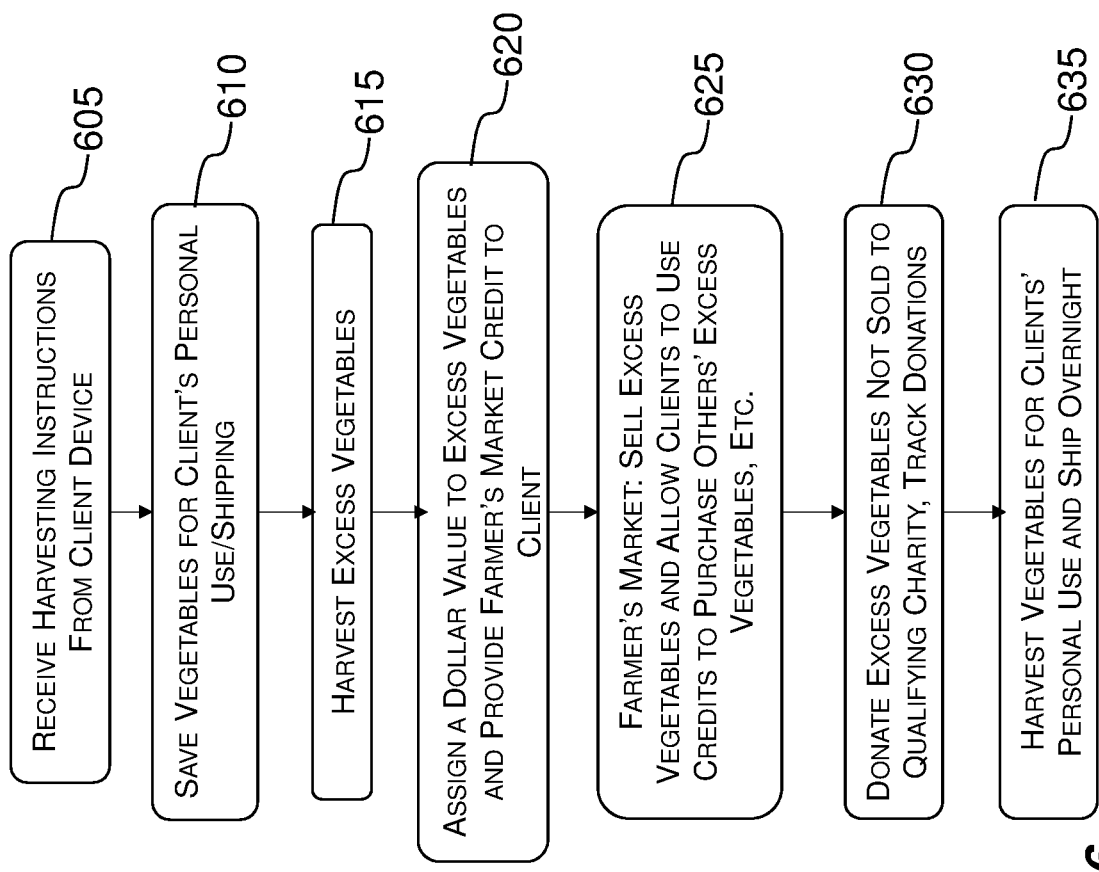
FIG. 6 is a flowchart illustrating a harvesting and post-harvesting process used by an embodiment of the gardening system.

FIG. 6 describes one method (generally indicated at 600) for harvesting and conducting a local and/or virtual farmer's market to attempt to maximize the use of the harvest. This configuration may utilize the harvesting module 128 and/or the inventory management module 130, in addition to data stored as inventory, market price, and sales data 142, and/or other data 144. A client may first provide harvesting instructions (605). Such harvesting instructions may include what vegetables the client wishes to have shipped for their personal use that week. Such instructions may be received by the farm on, for example, by Friday (where Saturday is the day of the farmer's market). The farm may receive the harvesting instructions from the client (605) through the network 106. The farm determines what vegetables should be saved to ship to the client for their personal use based on the harvesting instructions received (610).

The farm may then proceed to harvest the "excess vegetables," (615) where "excess vegetables" are the vegetables which are ready to be harvested and which are not to be used for the client's personal use (i.e., vegetables which the client does not instruct to be shipped for their use). The farm may harvest the excess vegetables, for example, on a Friday or Saturday morning in the example with Saturday as the day of the local farmer's market.

The "excess" vegetables may then be weighed and assigned a dollar value based on the current market value (620). The client may be provided with a credit that is equal to the dollar value assigned to their excess vegetables (620). The excess, non-shipped vegetables are placed in the farmer's market for sale (625). A farmer's market, either local and/or virtual, may then be conducted (625), comprising at least the "excess vegetables," from all garden plots at the farm, and may also comprise other crops from the farm. If the farmer's market is virtual, the client may use the assigned "excess vegetable" credit to purchase other vegetables in the farmer's market (625). Thus, the farmer's market may be not only a typical, local market, but may also be a virtual online market which allows clients to use their credits from their "excess vegetables" to purchase additional fruits and vegetables they may desire. This may allow clients to benefit not only from their harvest, but from the harvest of other garden plots at the farm.

For example, a first client may choose to grow one or more types of tomatoes, but due to other planting needs, may not be able to grow every variety of tomato they prefer to consume. However, a second client at the same farm may have grown the variety preferred by the first client and may not need the entire crop. The method shown in FIG. 6 of harvesting excess vegetables which clients do not require for their personal use, and then putting the excess vegetables into a virtual and/or real farmer's market, allows the first client to "purchase" with their credits the "excess" of the tomato variety grown by the second client.

According to one aspect, an inventory management module (130 in FIG. 1) may be provided, in communication with a client device, which may allow real-time management of inventory of the farmer's market. The inventory management module 130 may have access to data 142, such as inventory, market price, and sales data, and/or other data 144, in order to manage the aspects of the farmer's market. For example, the inventory management module 130 may be used to assign the price to the "excess vegetables" and generate a credit, keep track of all "excess vegetables" and other inventory bought and sold in real time and update interface(s) accordingly, and/or provide sales data to a client. Where the client does not use all of their credits, the credits may be allowed to accrue and used another week, or towards fees for maintaining the garden plot, and/or may be cashed out (typically for a percentage of their value).

Following the virtual and/or real farmer's market, there may still be some "excess vegetables" which were not purchased (either by traditional means or by the exchange described above). These vegetables which were not purchased may be packed and donated to a qualifying charity (630 in FIG. 6). The value of excess vegetables donated to the local charity may be tracked (such as by inventory management module 130), and the client may receive at the end of the year a receipt confirming their total tax-deductible charitable donations for the year. This may be particularly helpful for food banks which typically receive many donations of canned food items, but not fresh vegetables. It may also ensure that none of the harvest is wasted, and that the client receives a small monetary benefit in the form of a tax-deduction, even from the portion of the harvest which they do not user personally and which they do not sell via the farmer's market.

After the farmer's market is concluded, the farm may then harvest the vegetables which were indicated to be shipped for the client's personal use and ship them overnight (635). If the client purchased any additional vegetables via the farmer's market, those vegetables may also be packed with the client's vegetables from their plot and shipped. Shipping together may reduce shipping fees. In the example above with a farmer's market on a Saturday, the vegetables which the client selected for harvesting and shipping for their personal use from their plot may be harvested Saturday evening or Sunday, packed with any vegetables the client purchased via the farmer's market, and shipped overnight to the client.

The system for remote gardening described herein may have a plurality of additional benefits. For example, each garden may be provided with bee hives. For example, each acre of garden plots may be supplied with a beehive. Each client having a garden plot may be allotted a "share" of honey each year from the beehive, and/or the honey may be sold.

It will be appreciated that many possible configurations exist for the size and shape of each garden plot, as well as the spacing between each garden plot on the farm. For example, in a single acre, it may be possible to fit approximately two hundred, twelve foot by twelve foot garden plots. It may be advantageous to provide walkways between each plot for the farmers to access the plots for harvesting and/or equipment maintenance. In one configuration, such walkways may be around two to three feet wide. This may also allow visitors to the farm to easily access the plots. For example, a client may live very close to a farm with their garden plot located thereon (such as clients who live in the suburbs and may be close to a farm, but for various reasons like HOA restrictions, etc. may not have a personal garden). Such clients may wish to personally visit the garden plot often. These clients may also choose to attend the Saturday farmer's market in person and pick up their vegetables rather than have them shipped.

The present invention may also comprise a non-transitory computer-readable medium having embodied thereon a computer readable program code for executing a method comprising: determining an optimal planting layout based on analytical analysis of a planting instruction received from a client, hardiness zone data, and companion planting data; sending a watering signal to a watering device in response to a watering instruction received from the client; and/or sending a camera movement signal to a camera in response to a camera movement instruction received from the client. The method may also comprise harvesting instructions as described above.

While various embodiments have been described hereinabove, it is to be appreciated that various changes in form and detail may be made without departing from the spirit and scope of the invention(s) presently or hereafter claimed.

The invention claimed is:

1. A method of operating a remote garden plot according to instructions provided by a client, the method comprising:
   receiving, at an application server from a client device, a request to control a remote garden plot, the remote garden plot having a watering device and a camera, the watering device and camera in communication with the application server;
   receiving, at the application server from the client device, a planting instruction to plant the garden plot, said planting instruction identifying at least a first plant and a second plant;
   determining an optimum planting layout for the garden plot, and wherein determining the optimum planting layout comprises a companion planting module configured to access at least companion planting data regarding the at least first plant, and wherein the companion planting module is configured to determine an optimal planting map based on an analytical analysis of the planting instruction and companion planting data accessible to the companion planting module;
   receiving, at the application server from the client device, a watering instruction;
   sending a signal to the watering device to water the remote garden plot according to the watering instruction;
   receiving, at the application server from the client device, a camera movement instruction; and
   sending a signal to the camera to move the camera according to the camera movement instruction.

2. The method of operating the remote garden plot of claim 1, wherein the method further comprises receiving, from the client device over a network, payment code information.

3. The method of operating the remote garden plot of claim 1, wherein the method further comprises determining an optimum location for the garden plot, and wherein determining the optimum location for the garden plot comprises a plant hardiness module configured to access at least hardiness zone data relating to the at least first plant.

4. The method of operating the remote garden plot of claim 1, wherein the watering device comprises a controller in communication with one or more valves, and wherein the step of sending the signal to the watering device comprises sending a signal to the controller which opens the one or more valves.

5. The method of operating the remote garden plot of claim 1, wherein the camera comprises a controller in communication with a motor, and wherein the step of sending the signal to the camera comprises sending a signal to the controller which actuates the motor.

6. The method of claim 1, further comprising the step of receiving, at the application server from the client device, harvesting instructions.

7. The method of claim 6, wherein the harvesting instructions comprise at least one of an instruction to ship vegetables, an instruction to sell vegetables, and an instruction to donate vegetables.

8. The method of claim 7, further comprising the step of calculating, by an inventory management module, a value of vegetables associated with the instruction to sell vegetables.

9. The method of claim 8, further comprising the step of assigning a credit to the client based on the value of vegetables associated with the instruction to sell vegetables.

10. The method of claim 7, further comprising selling vegetables according to the instruction to sell vegetables.

11. The method of claim 7, further comprising the step of calculating, by an inventory management module, a value of vegetables associated with the instruction to donate vegetables.

12. The method of claim 11, further comprising the step of producing a receipt for the client indicating the value of the vegetables associated with the instruction to donate vegetables.

13. A system for remotely controlling a garden plot, the system comprising:
   a processor;
   a companion planting module coupled to the processor, wherein the companion planting module is configured to optimize a planting layout of the garden plot based on one or more planting instructions received from a client device, wherein the one or more planting instructions comprise an instruction to plant a first plant and an instruction to plant a second plant, and wherein the companion planting module is configured to access at least companion planting data regarding the at least first plant, and wherein the companion planting module is configured to determine an optimal planting map based on an analytical analysis of the one or more planting instructions and companion planting data regarding the at least first plant;
   a watering module coupled to the processor, wherein the watering module is in communication with an electronic relay of a watering device at the garden plot, and wherein the watering module is configured to activate the electronic relay of the watering device based on one or more watering instructions received from the client device;

a camera control module coupled to the processor, wherein the camera control module is in communication with a camera controller, and wherein the camera control module is configured to send a signal to the camera controller based on one or more watering instructions received from the client device; and the garden plot, the garden plot having one or more watering devices thereon and a camera in view of the garden plot.

14. The system of claim 13, wherein the camera is located near the center of the garden plot.

15. The system of claim 13, further comprising a harvesting module coupled to the processor, and wherein the harvesting module is configured to request and receive instructions regarding harvesting vegetables.

16. The system of claim 15, wherein the instructions received regarding harvesting vegetables comprises one or more of an instruction to ship vegetables, an instruction to sell vegetables, and an instruction to donate vegetables.

17. The system of claim 15, further comprising an inventory management module coupled to the processor, and wherein the inventory management module is configured to calculate a value of vegetables based on the instruction to sell vegetables and market price data.

18. A method of operating a remote garden plot according to instructions provided by a client, the method comprising:

receiving, at an application server from a client device, a request to control a remote garden plot, the remote garden plot having a camera and a watering device in communication with the application server;

receiving, at the application server from the client device, a planting instruction to plant the garden plot, said instruction identifying at least a first plant and a second plant;

determining, based on the planting instruction, an optimal planting layout of the garden plot and wherein determining the optimal planting layout comprises a companion planting module configured to access at least companion planting data regarding the at least first plant and second plant, and wherein the companion planting module is configured to determine the optimal planting layout of the garden plot based on an analytical analysis of the planting instruction and companion planting data accessible to the companion planting module;

receiving, at the application server from the client device, a watering instruction;

sending a signal to the watering device to water the remote garden plot according to the watering instruction;

receiving, at the application server from the client device, a camera movement instruction;

sending a signal to the camera to move the camera according to the camera movement instruction.

* * * * *